(12) United States Patent
Sintyureva

(10) Patent No.: US 12,075,810 B2
(45) Date of Patent: Sep. 3, 2024

(54) METHOD OF MAKING A TOBACCO EXTRACT

(71) Applicant: NICOVENTURES TRADING LIMITED, London (GB)

(72) Inventor: Marina Sintyureva, London (GB)

(73) Assignee: NICOVENTURES TRADING LIMITED, London (GB)

( * ) Notice: Subject to any disclaimer, the term of this patent is extended or adjusted under 35 U.S.C. 154(b) by 468 days.

(21) Appl. No.: 16/614,274

(22) PCT Filed: May 9, 2018

(86) PCT No.: PCT/EP2018/062119
§ 371 (c)(1),
(2) Date: Nov. 15, 2019

(87) PCT Pub. No.: WO2018/210677
PCT Pub. Date: Nov. 22, 2018

(65) Prior Publication Data
US 2021/0153544 A1 May 27, 2021

(30) Foreign Application Priority Data
May 15, 2017 (GB) .................................... 1707761

(51) Int. Cl.
| | |
|---|---|
| *A24B 15/167* | (2020.01) |
| *A24B 15/24* | (2006.01) |
| *A24F 40/10* | (2020.01) |
| *A24F 40/42* | (2020.01) |
| *B01D 11/02* | (2006.01) |

(52) U.S. Cl.
CPC ............ *A24B 15/167* (2016.11); *A24B 15/24* (2013.01); *A24F 40/10* (2020.01); *A24F 40/42* (2020.01); *B01D 11/0203* (2013.01); *B01D 11/0215* (2013.01); *B01D 11/0288* (2013.01); *B01D 11/0292* (2013.01)

(58) Field of Classification Search
CPC ........................... A24B 15/24; B01D 11/0203
USPC ...................................................... 131/297
See application file for complete search history.

(56) References Cited

U.S. PATENT DOCUMENTS

| | | |
|---|---|---|
| RE12,994 E | 7/1909 | Gloystbin |
| 3,880,172 A | 4/1975 | Anderson et al. |
| 4,153,063 A | 5/1979 | Roselius et al. |
| 4,506,682 A | 3/1985 | Muller |
| 4,561,452 A | 12/1985 | Gahrs |
| 4,727,889 A | 3/1988 | Niven, Jr. et al. |
| 4,734,484 A * | 3/1988 | Alfes ................. C08G 75/0213 528/502 A |
| 4,756,318 A | 7/1988 | Clearman et al. |
| 5,018,540 A | 5/1991 | Grubbs et al. |
| 5,025,812 A | 6/1991 | Fagg et al. |
| 5,065,775 A * | 11/1991 | Fagg ..................... A24B 15/24 356/443 |
| 5,073,267 A | 12/1991 | Adda |
| 5,119,835 A | 6/1992 | Heemann et al. |
| 5,318,050 A | 6/1994 | Gonzalez-Parra et al. |
| 5,435,325 A | 7/1995 | Clapp et al. |
| 5,497,792 A | 3/1996 | Prasad et al. |
| 5,617,881 A | 4/1997 | Kossmehl et al. |
| 7,726,320 B2 * | 6/2010 | Robinson ................ A24F 40/40 131/194 |
| 8,479,747 B2 * | 7/2013 | O'Connell ......... B01D 11/0288 131/300 |
| 8,887,737 B2 * | 11/2014 | Howell ................... A24B 15/24 131/194 |
| 9,554,595 B2 | 1/2017 | Buchberger |
| 10,123,560 B2 | 11/2018 | Rasouli et al. |
| 10,271,573 B2 * | 4/2019 | Lipowicz ............. A24B 15/308 |
| 10,375,996 B2 | 8/2019 | Aoun et al. |
| 10,390,555 B2 * | 8/2019 | Fujisawa ............. A24B 15/167 |
| 10,426,199 B2 | 10/2019 | Turner et al. |
| 11,044,938 B2 * | 6/2021 | Buehler ............... B01D 5/0027 |

(Continued)

FOREIGN PATENT DOCUMENTS

| | | |
|---|---|---|
| CN | 1440699 A | 9/2003 |
| CN | 1459256 A | 12/2003 |

(Continued)

OTHER PUBLICATIONS

Tray Column & Tray Types, http://www.separationprocesses.com/Operations/POT_Chp02a.htm (Year: 2016).*

(Continued)

*Primary Examiner* — Russell E Sparks
(74) *Attorney, Agent, or Firm* — WOMBLE BOND DICKINSON (US) LLP

(57) ABSTRACT

Embodiments described herein include a method of making a tobacco extract comprising; (a) providing tobacco and an entrapment solvent in a partitioned vessel, wherein the tobacco and entrapment solvent are separated by the partition, and the vessel is configured such that the tobacco and entrapment solvent cannot contact each other; (b) flowing a supercritical extraction solvent through the vessel, wherein the extraction solvent and any dissolved substances can pass through the partition; whereby tobacco components are extracted from the tobacco into the extraction solvent and carried across the partition, wherein the extraction solvent contacts the entrapment solvent and tobacco components are transferred from the supercritical extraction solvent into the entrapment solvent.

16 Claims, No Drawings

(56) References Cited

U.S. PATENT DOCUMENTS

| | | |
|---|---|---|
| 11,511,056 B2 | 11/2022 | Hepworth et al. |
| 11,612,702 B2 | 3/2023 | Bowen et al. |
| 2004/0025891 A1 | 2/2004 | McAdam et al. |
| 2006/0196517 A1 | 9/2006 | Gedevanishvili et al. |
| 2007/0023058 A1 | 2/2007 | Howell et al. |
| 2007/0137663 A1 | 6/2007 | Taylor et al. |
| 2007/0193595 A1 | 8/2007 | Haruki et al. |
| 2008/0257367 A1 | 10/2008 | Paterno et al. |
| 2009/0032036 A1 | 2/2009 | Uematsu et al. |
| 2011/0159160 A1 | 6/2011 | Jonsson et al. |
| 2011/0259353 A1 | 10/2011 | Coleman, III et al. |
| 2012/0006341 A1 | 1/2012 | Schmekel et al. |
| 2012/0125354 A1 | 5/2012 | Byrd et al. |
| 2012/0145170 A1 | 6/2012 | O'Connell |
| 2012/0152265 A1 | 6/2012 | Dube et al. |
| 2012/0167901 A1 | 7/2012 | Onno |
| 2012/0199145 A1 | 8/2012 | Byrd et al. |
| 2012/0318287 A1 | 12/2012 | Andersen |
| 2013/0008457 A1 | 1/2013 | Zheng et al. |
| 2013/0160777 A1 | 6/2013 | Murphy |
| 2013/0239981 A1 | 9/2013 | Sun et al. |
| 2013/0255702 A1 | 10/2013 | Griffith, Jr. et al. |
| 2014/0096780 A1 | 4/2014 | Gerardi |
| 2014/0190500 A1 | 7/2014 | Duan et al. |
| 2014/0238396 A1 | 8/2014 | Buchberger |
| 2014/0261483 A1 | 9/2014 | Hopps |
| 2015/0027453 A1 | 1/2015 | Tessmann |
| 2015/0150305 A1 | 6/2015 | Shenkal |
| 2015/0374035 A1 | 12/2015 | Sanchez et al. |
| 2016/0081395 A1 | 3/2016 | Thorens et al. |
| 2016/0100626 A1 | 4/2016 | Ishida |
| 2016/0106144 A1 | 4/2016 | Muehlbauer et al. |
| 2016/0205992 A1 | 7/2016 | Bell et al. |
| 2019/0320718 A1 | 10/2019 | Yilmaz et al. |
| 2021/0106051 A1 | 4/2021 | Han et al. |

FOREIGN PATENT DOCUMENTS

| | | |
|---|---|---|
| CN | 1899142 A | 1/2007 |
| CN | 101247739 A | 8/2008 |
| CN | 101338248 A | 1/2009 |
| CN | 101830941 A | 9/2010 |
| CN | 102106602 A | 6/2011 |
| CN | 102199490 A | 9/2011 |
| CN | 102326859 A | 1/2012 |
| CN | 102488318 A | 6/2012 |
| CN | 102640985 A | 8/2012 |
| CN | 102894469 A | 1/2013 |
| CN | 102994228 A | 3/2013 |
| CN | 103060094 A | 4/2013 |
| CN | 103230094 A | 8/2013 |
| CN | 103235066 A | 8/2013 |
| CN | 103242960 A | 8/2013 |
| CN | 103462206 A | 12/2013 |
| CN | 103468403 A | 12/2013 |
| CN | 103484245 A | 1/2014 |
| CN | 103720030 A | 4/2014 |
| CN | 103783651 A | 5/2014 |
| CN | 103783660 A | 5/2014 |
| CN | 103881817 A | 6/2014 |
| CN | 104489912 A | 4/2015 |
| CN | 105641970 A | 6/2016 |
| DE | 554139 C | 7/1932 |
| EP | 0280817 A2 | 9/1988 |
| EP | 0323699 A2 | 7/1989 |
| EP | 0338831 A2 | 10/1989 |
| EP | 0434333 A2 | 6/1991 |
| EP | 0443761 A1 | 8/1991 |
| EP | 0822247 A2 | 2/1998 |
| EP | 0941140 B1 | 11/2002 |
| EP | 0845220 B1 | 9/2003 |
| EP | 1267650 B1 | 12/2005 |
| EP | 1815899 A1 | 8/2007 |
| EP | 1355708 B1 | 4/2008 |
| EP | 1980163 A1 | 10/2008 |
| EP | 2544560 A1 | 1/2013 |
| EP | 2560509 A1 | 2/2013 |
| EP | 2008534 B1 | 7/2013 |
| EP | 2523568 B1 | 12/2013 |
| EP | 2640204 B1 | 1/2014 |
| EP | 2727477 A2 | 5/2014 |
| EP | 1951074 B1 | 7/2014 |
| EP | 2769631 A1 | 8/2014 |
| EP | 1915064 B1 | 4/2017 |
| EP | 2303425 B1 | 11/2019 |
| GB | 1357645 A | 6/1974 |
| GB | 2173985 A | 10/1986 |
| GB | 2515883 A | 1/2015 |
| JP | S519838 A | 1/1976 |
| JP | S62176504 A | 8/1987 |
| JP | S63229102 A | 9/1988 |
| JP | H0249572 A | 2/1990 |
| JP | H03127975 A | 5/1991 |
| JP | H069986 A | 1/1994 |
| JP | H0698746 A | 4/1994 |
| JP | H07227502 A | 8/1995 |
| JP | H0819389 A | 1/1996 |
| JP | H0823952 A | 1/1996 |
| JP | H0910502 A | 1/1997 |
| JP | 3014704 B2 | 2/2000 |
| JP | 3223058 B2 | 10/2001 |
| JP | 2001276603 A | 10/2001 |
| JP | 3325028 B2 | 9/2002 |
| JP | 2005532821 A | 11/2005 |
| JP | 2007136404 A | 6/2007 |
| JP | 2008055255 A | 3/2008 |
| JP | 2009502160 A | 1/2009 |
| JP | 2014530633 A | 11/2014 |
| JP | 2017511703 A | 4/2017 |
| KR | 10-2017-0040787 | 4/2017 |
| KR | 20170040787 A | 4/2017 |
| KR | 10-2017-0046938 | 5/2017 |
| KR | 20170046938 A | 5/2017 |
| RU | 2250717 C2 | 4/2005 |
| RU | 2250718 C2 | 4/2005 |
| RU | 2250724 C2 | 4/2005 |
| RU | 2250734 C2 | 4/2005 |
| RU | 2250739 C2 | 4/2005 |
| WO | WO-9808584 A1 | 3/1998 |
| WO | WO-0165954 A1 | 9/2001 |
| WO | WO-0226343 A2 | 4/2002 |
| WO | WO-2004008888 A1 | 1/2004 |
| WO | WO-2007052159 A2 | 5/2007 |
| WO | WO-2007053096 A1 | 5/2007 |
| WO | WO-2007053097 A1 | 5/2007 |
| WO | WO-2007053098 A1 | 5/2007 |
| WO | WO-2008026446 A1 | 3/2008 |
| WO | WO-2009019514 A2 | 2/2009 |
| WO | WO-2009156763 A1 | 12/2009 |
| WO | WO-2011088171 A2 | 7/2011 |
| WO | 2011110843 A1 | 9/2011 |
| WO | WO-2011133633 A1 | 10/2011 |
| WO | WO-2012068375 A1 | 5/2012 |
| WO | WO-2012174677 A1 | 12/2012 |
| WO | WO-2013060827 A1 | 5/2013 |
| WO | WO-2013142483 A1 | 9/2013 |
| WO | WO-2013187402 A1 | 12/2013 |
| WO | WO-2014058837 A1 | 4/2014 |
| WO | WO-2014094337 A1 | 6/2014 |
| WO | WO-2015107552 A1 | 7/2015 |
| WO | WO-2015177177 A1 | 11/2015 |
| WO | WO-2016005709 A1 | 1/2016 |
| WO | WO-2016024083 A1 | 2/2016 |
| WO | WO-2016062777 A1 | 4/2016 |
| WO | WO-2016135331 A1 | 9/2016 |
| WO | WO-2016184977 A1 | 11/2016 |
| WO | 2018/210675 A1 | 11/2018 |
| WO | 2018/210676 A1 | 11/2018 |
| WO | 2018/210678 A1 | 11/2018 |
| WO | 2018/210680 A1 | 11/2018 |
| WO | 2018/210681 A1 | 11/2018 |
| WO | 2018210677 A1 | 11/2018 |
| WO | 2018210679 A1 | 11/2018 |

(56) References Cited

FOREIGN PATENT DOCUMENTS

OTHER PUBLICATIONS

Sieve Trays, Munters, https://www.munters.com/en/munters/products/mass-transfer/sieve-trays/ (Year: 2022).*
Merriam-Webster Dictionary, Definition of Through, https://www.merriam-webster.com/dictionary/through (Year: 2022).*
Anonymous: "iFUSE—The Heat not Burn Hybrid—Heat Not Burn," Jan. 4, 2017 (Jan. 4, 2017), XP055493889. Retrieved from the Internet: URL: https://heatnotburn.co.uk/ifuse-heat-not-burn-hybrid/ [retrieved on Jul. 19, 2018], pp. 1-15.
Anonymous: "Where Does the Nicotine Used in Electronic Cigarettes Come From?," Quora—Aug. 23, 2015 (Aug. 23, 2015), XP055494026, Retrieved from the Internet: URL: https://www.quora.com/Where-does-the-nicotine-used-in-electronic-cigarettes-come-from, [retrieved on Jul. 19, 2018], 2 pages.
International Preliminary Report on Patentability for Application No. PCT/EP2018/062119, dated Nov. 28, 2019, 8 pages.
International Preliminary Report on Patentability for Application No. PCT/EP2018/062120, dated Nov. 28, 2019, 9 pages.
International Preliminary Report on Patentability for Application No. PCT/EP2018/062122, dated Nov. 28, 2019, 9 pages.
International Preliminary Report on Patentability for Application No. PCT/EP2018/062116, dated Nov. 28, 2019, 8 pages.
International Preliminary Report on Patentability for Application No. PCT/EP2018/062121, dated Nov. 28, 2019, 8 pages.
International Preliminary Report on Patentability for Application No. PCT/EP2018/062123, dated Nov. 28, 2019, 10 pages.
International Preliminary Report on Patentability for Application No. PCT/EP2018/062117, dated Nov. 28, 2019, 8 pages.
International Search Report and Written Opinion for Application No. PCT/EP2018/062116, dated Aug. 20, 2018, 22 pages.
International Search Report and Written Opinion for Application No. PCT/EP2018/062117, dated Jul. 31, 2018, 14 pages.
International Search Report and Written Opinion for Application No. PCT/EP2018/062120, dated Jul. 30, 2018, 15 pages.
International Search Report and Written Opinion for Application No. PCT/EP2018/062121, dated Jul. 30, 2018, 14 pages.
International Search Report and Written Opinion for Application No. PCT/EP2018/062122, dated Jul. 31, 2018, 15 pages.
International Search Report and Written Opinion for Application No. PCT/EP2018/062123, dated Nov. 28, 2018, 19 pages.
Marcolli C., et al., "Water Activity in Polyol/Water Systems: New UNIFAC Parameterization," Atmospheric Chemistry and Physics, Copernicus GMBH, Germany, Retrieved from the Internet: URL: http://www.atmos-chemphys.net/5/1545/2005/acp-5-1545-2005.pdf, [retrieved on Nov. 26, 2014], vol. 5 (6), Jun. 1, 2005, pp. 1545-1555.
Notice of Reasons for Refusal for Japanese Application No. 2019-562269, dated Mar. 2, 2021, 12 pages.
Office Action for Japanese Application No. 2019-562270, dated Dec. 8, 2020, 6 pages.
Office Action for Japanese Application No. 2019-562304, dated Dec. 1, 2020, 6 pages.
Office Action for Japanese Application No. 2019-562384, dated Dec. 1, 2020, 5 pages.
Office Action for Korean Application No. 10-2019-7033531, dated Aug. 24, 2021, 12 pages.
Office Action for Korean Application No. 10-2019-7033534, dated Aug. 24, 2021, 13 pages.
Office Action for Korean Application No. 10-2019-7033535, dated Aug. 24, 2021, 12 pages.
Office Action for Korean Application No. 10-2019-7033533, dated Aug. 24, 2021, 12 pages.
Office Action dated Feb. 2, 2021 for Japanese Application No. 2019-562273, 12 pages.
Office Action dated Apr. 24, 2020 for Russian Application No. 2019136484, 18 pages.
Search Report for Japanese Application No. 2019-562269, dated Feb. 17, 2021, 20 pages.
International Search Report and Written Opinion, Application No. PCT/EP2018/062119, dated Jul. 30, 2018, 14 pages.
"Boiling Points and Structures of Hydrocarbons", 2003, [online], Virtual Chembook, Elmhurst College, Retrieved from, http://chemistry.elmhurst.edu/vchembook/501hcboilingpts.html, on Apr. 27, 2022, 1 page.
Office Action for Japanese Application No. 2019-562289, dated Dec. 8, 2020, 6 pages.
Office Action for Canadian Application No. 3,062,987, dated Oct. 7, 2022, 4 pages.
Office Action for Korean Application No. 10-2019-7033532 dated Feb. 7, 2021, 16 pages.
Application and File History for U.S. Appl. No. 16/614,111, filed Nov. 15, 2019, Inventor Marina Sintyureva.
Application and File History for U.S. Appl. No. 16/614,119, filed Nov. 15, 2019, Inventor Helena Digard.
Application and File History for U.S. Appl. No. 16/614,267, filed Nov. 15, 2019, Inventor Helena Digard et al.
Application and File History for U.S. Appl. No. 16/614,269, filed Nov. 15, 2019, Inventor Helena Digard et al.
Application and File History for U.S. Appl. No. 16/614,270, filed Nov. 15, 2019, Inventor Geoff Foss-Smith et al.
Application and File History for U.S. Appl. No. 16/614,276, filed Nov. 15, 2019, Inventor Marina Sintyureva et al.
Search Report received for Chinese Patent Application No. 201880032692.4, mailed on Jun. 25, 2021, 1 page (English Translation Only).

* cited by examiner

METHOD OF MAKING A TOBACCO EXTRACT

PRIORITY CLAIM

The present application is a National Phase entry of PCT Application No. PCT/EP2018/062119, filed May 9, 2018, which claims priority from GB Patent Application No. 1707761.1, filed May 15, 2017.

TECHNICAL FIELD

The present invention relates to a method of making a tobacco extract and to the tobacco extract resulting from that process. The invention also provides cartridges containing the tobacco extract for use in a smoking article, and smoking articles comprising the tobacco extract.

BACKGROUND

Tobacco material is heated in smoking articles for the purpose of releasing substances contained in the material and delivering these as an aerosol.

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, material. The material may be, for example, tobacco or other non-tobacco products, which may or may not contain nicotine.

Electronic cigarettes or "e-cigarettes" are another product that has been formulated as an alternative to combustible products. These devices contain a volatilizable solution which generates an inhalable aerosol on heating. These solutions may contain components of tobacco. It is therefore useful to be able to selectively extract tobacco components.

EP1915064 describes a process for making reconstituted tobacco including a tobacco extraction step. The extraction process uses supercritical carbon dioxide to extract tobacco components, and then contacts the supercritical carbon dioxide containing tobacco components with propylene glycol. The tobacco components transfer into the propylene glycol. The carbon dioxide is supercritical throughout.

SUMMARY

According to a first aspect of the present invention, there is provided a method of making a tobacco extract comprising;

(a) providing tobacco and an entrapment solvent in a partitioned vessel, wherein the tobacco and entrapment solvent are separated by the partition, and the vessel is configured such that the tobacco and entrapment solvent cannot contact each other;

(b) flowing a supercritical extraction solvent through the vessel, wherein the extraction solvent and any dissolved substances can pass through the partition; whereby tobacco components are extracted from the tobacco into the extraction solvent and carried across the partition, wherein the extraction solvent contacts the entrapment solvent and tobacco components are transferred from the supercritical extraction solvent into the entrapment solvent.

The inventors have established that variations in the extraction process using a supercritical extraction solvent result in variation in the tobacco extract composition and/or in the physical properties of the extract.

The extraction solvent is supercritical throughout steps (a) and (b). In some cases, the process may be isobaric and isothermal. The use of isobaric and isothermal conditions means that the solvent remains supercritical throughout and there is no need to reheat or re-pressurize the extraction solvent. The apparatus configuration is simpler than in EP1915064, because only one vessel is required. Further, the energy required to maintain the apparatus at supercritical conditions is reduced when using a single chamber as compared to a larger, multi-chamber arrangement (EP1915064).

At the end of the process, the method may additionally comprise the step of;

(c) altering the conditions in the vessel so that the extraction solvent is subcritical, thereby separating the extraction solvent and any remaining dissolved tobacco components, at least some of which are subsequently dissolved in the entrapment solvent.

The transfer to subcritical conditions enhances transfer of the dissolved tobacco components to the entrapment solvent, improving the organoleptic properties of the extract. In some cases, a further step of (d) washing the vessel with entrapment solvent which dissolves any tobacco components that are not already solvated. (The inventors have observed that some may condense on the vessel walls, for example)

The vessel may be configured in a number of ways. For example:

In one embodiment, the entrapment solvent may be provided in an upper portion of the vessel, above the tobacco in a lower portion, and the partition may be in the form of a bubble cap tray, sieve plate, valve plate or the like.

In an alternative embodiment, the entrapment solvent may be provided in a 20 lower portion of the vessel, below the tobacco in an upper portion, and the partition may be in the form of a sinter plate, a very fine mesh or the like. Suitably, the sinterplate has a pore size or the mesh has a mesh size of about 1-100 μm.

In some cases, the supercritical extraction solvent may be circulated through the vessel and extracts components of tobacco on each pass. In some cases, an external line may be provided so that the supercritical extraction solvent can be flowed through the vessel from an inlet to an outlet, and then circulated back to the inlet via the external line. In some vessel configurations, the inlet may be at the base of the vessel and the outlet may be at the top. In some vessel configurations, the inlet may be at the top of the vessel and the outlet may be at the bottom. In some configurations, where the tobacco is disposed adjacent to the outlet and the entrapment solvent is disposed adjacent to the inlet, the dissolved tobacco components pass through the external line. Where an external line is present, it is maintained at the same supercritical conditions as in the vessel (i.e. the system is isobaric and isothermal).

In some cases, the entrapment solvent comprises an aerosol generating agent.

In some cases, the entrapment solvent consists essentially or of consists of one or more aerosol generating agents.

In some cases, the extraction solvent used in the above process comprises carbon dioxide. In some cases, the extraction solvent consists essentially of or consists of carbon dioxide.

In some cases, the entrapment solvent used in the above method comprises a polyol. In some cases, the entrapment solvent comprises glycerol and/or propylene glycol. In some cases, the entrapment solvent consists essentially of or consists of glycerol.

In some cases, the tobacco components extracted by the methods described herein include one or more of nicotine and tobacco aromas and flavors.

In some cases, the method described herein may further comprise the step of providing the entrapment solvent containing dissolved tobacco components in a cartridge, wherein the cartridge is configured for use in a smoking article.

According to a second aspect of the invention, there is provided a tobacco extract obtained by or obtainable by a method described herein.

According to a further aspect, there is provided a cartridge configured for use in a smoking article, the cartridge containing a tobacco extract obtained by or obtainable by a method described herein. The cartridge may be configured for use in an electronic cigarette.

According to a further aspect, there is provided a smoking article containing a tobacco extract obtained by or obtainable by a method described herein. In some cases, the smoking article may contain the tobacco extract in an insertable cartridge, the cartridge being configured for use in the smoking article. The smoking article may additionally comprise a mouthpiece. The smoking article may additionally comprise a heater which volatilizes the entrapment solvent containing tobacco extract in use. The smoking article may be an electronic cigarette.

According to a further aspect, there is provided the use of a tobacco extract obtained by or obtainable by a method described herein to generate an inhalable aerosol. In some cases, the tobacco extract is used in a smoking article to generate the inhalable aerosol.

Further features and advantages of the invention will become apparent from the following description of preferred embodiments of the invention, given by way of example only.

DETAILED DESCRIPTION

For the avoidance of doubt, the term "tobacco extract" as used herein refers to the entrapment solvent containing tobacco components.

A supercritical fluid is any substance at a temperature and pressure above its critical point, where distinct liquid and gas phases do not exist. Supercritical fluids can effuse through solids like a gas, and dissolve materials like a liquid. Supercritical fluids have a higher fluid density than gases and therefore have a higher solvent capacity.

In some cases, one or more flavors may be added to the tobacco extract. As used herein, the term "flavor" refers to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie® (honeyed whisky liqueur), bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

As used herein, an "aerosol generating agent" is an agent that promotes the generation of an aerosol on heating. An aerosol generating agent may promote the generation of an aerosol by promoting an initial vaporization and/or the condensation of a gas to an inhalable solid and/or liquid aerosol.

In general, suitable aerosol generating agents include, but are not limited to: a polyol such as sorbitol, glycerol, and glycols like propylene glycol or triethylene glycol; a non-polyol such as monohydric alcohols, high boiling point hydrocarbons, acids such as lactic acid, glycerol derivatives, esters such as diacetin, triacetin, triethylene glycol diacetate, triethyl citrate or myristates including ethyl myristate and isopropyl myristate and aliphatic carboxylic acid esters such as methyl stearate, dimethyl dodecanedioate and dimethyl tetradecanedioate. In some cases, the aerosol generating agent comprises one or more of glycerol, propylene glycol, triacetin and isopropyl myristate, suitably glycerol and/or propylene glycol.

The weight ratio of aerosol generating agent to tobacco (dry weight) may be from about 2:1 to about 1:3, suitably from 3:2 to about 1:2, suitably about 1:1.

The method according to the invention may additionally comprise an initial step of adding water to the tobacco. The amount of water added may be from about 2% to about 20% based on the dry weight of tobacco, suitably from about 2%, 5% or 8% to about 12%, 15%, 18% or 20%. This pre-treatment with water increases the transfer of polar tobacco components (such as flavors) from the tobacco to the entrapment solvent.

In the process according to the invention, a higher pressure under supercritical conditions increases the solvent capacity and increases the efficiency of extraction. However, more energy is required to achieve and maintain higher pressures. Thus, the supercritical conditions are suitably selected to balance these conflicting requirements.

Where the supercritical fluid comprises carbon dioxide, the pressure at which extraction occurs may, in some cases, be from about 8 MPa, 10 MPa, 15 MPa, 20 MPa or 25 MPa to about 85 MPa, 70 MPa, 55 MPa, 40 MPa or 30 MPa, suitably from 8-85 MPa, 15-40 MPa or 20-30 MPa. Where the supercritical fluid comprises carbon dioxide, the temperature at which extraction occurs may, in some cases, be from about 308K, 318K or 328K to about 473K, 430K, 390K or 350K, suitably from 308-473K, 308-430K, or 328-350K.

EXAMPLES

Analytical Methods

Water activity values reported below were measured at 24.9-25.2° C. using the Aqualab Prewater Activity meter. The values were determined using the dewpoint method.

Viscosity values reported below were measured at 25° C. using a Gemini Rheometer from Bohlin Instruments.

Pre-Extraction (Pre-Treatment of Tobacco):

Ground Virginia tobacco leaf of the particle size ranging from 355 µm to 3.5 mm was pre-treated by addition of water (10% of total tobacco weight). The mixture of tobacco and water was left for equilibration for 15 minutes post water addition (which is sufficient time for the water to be fully absorbed).

Example 1: Example of Process According to the Invention

A stainless steel extraction vessel (5 L autoclave) with a solvent inlet at the base and outlet at the top, and an external circulation line connecting the outlet with the inlet, was loaded with pre-treated tobacco (1.2 kg plus 10 wt % water); the tobacco was placed on a stainless steel sintered plate in the bottom of the extraction vessel. The sintered plate distributes the supercritical fluid which enters the extraction vessel via a narrow inlet below the tobacco.

Filter paper was placed on top of the tobacco to hold tobacco particles in place and prevent them moving around the circulation loop/piping.

A liquid trap containing 0.5 kg of glycerol was placed on the top of the tobacco. Carbon dioxide may suitably be pumped through the system at the rate 5-23 kg/hr.

In this instance, carbon dioxide was pumped through the system at the rate 10 kg/hr while the extraction chamber and circulation line were maintained at 26 MPa and 338K. At these conditions, carbon dioxide is supercritical.

The supercritical CO2 fluid flowed through the bed of ground tobacco and dissolved components of tobacco. The flow of supercritical CO2 containing tobacco constituents then passed through the glycerol, tobacco components transferred into the glycerol.

CO2 was circulated for 180 minutes and the system was then depressurized. Separation of the extract from the supercritical CO2 occurred during the depressurization stage. Removal of CO2 was achieved by pressure and temperature reduction with absorption of the extracted compounds in glycerol.

Comparative Test

A comparative test was run using the same conditions as example 1. However, the apparatus was different. 1.2 kg of glycerol was provided in a separation chamber, which is distinct from the extraction chamber. The separation and extraction chambers were linked by a transfer line. The supercritical solvent was circulated through the two chambers.

All other aspects of the comparative test were the same as in example 1.

The comparative test is a representative example of the processes described generally in EP1915064.

Data

Tobacco Extract Properties:

| Experiment | Nicotine (mg/g) | Water (wt %) | NNN (ng/g) | NNK (ng/g) | Viscosity (Pa s) | pH | Density (g/cm$^3$) | Water activity (Aw) |
|---|---|---|---|---|---|---|---|---|
| Example 1 | 5.28 | 8.18 | 53.9 | 38 | 0.24 | 6.33 | 1.24 | 0.3 |
| Comp. Test | 4.7 | 5.5 | 71.1 | 49.1 | 0.32 | 6.73 | 1.25 | 0.24 |

Surprisingly, it can be seen that using a single chamber configuration (example 1) rather than a multi-chamber arrangement (comparative test) alters the composition of the extract.

Similar results have been observed when using Oriental or Burley starting tobaccos.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A method of making a tobacco extract, the method comprising:
   (a) providing tobacco and an entrapment solvent in a partitioned vessel, wherein the tobacco and entrapment solvent are separated by a partition, and the vessel is configured such that the tobacco and entrapment solvent cannot contact each other;
   (b) flowing a supercritical extraction solvent into the vessel, wherein the extraction solvent and any dissolved substances can pass through the partition; whereby tobacco components are extracted from the tobacco into the extraction solvent and carried across the partition, wherein the extraction solvent contacts the entrapment solvent and the tobacco components are transferred from the extraction solvent into the entrapment solvent,
   wherein the method further comprises the step of providing the entrapment solvent containing dissolved tobacco components in a cartridge, wherein the cartridge is configured for use in a smoking article.

2. The method of claim 1, wherein the partition is selected from the group consisting of: a bubble cap tray, a sieve plate, a valve plate, a sinter plate, and a very fine mesh.

3. The method of claim 1, further comprising:
   (c) altering the conditions in the vessel so that the extraction solvent is subcritical, thereby separating the extraction solvent and any remaining dissolved tobacco components, at least some of which are subsequently dissolved in the entrapment solvent.

4. The method according to claim 1, wherein the extraction solvent comprises carbon dioxide.

5. The method according to claim 4 wherein, during (a) and (b), the temperature is in the range of about 308-473K, and the pressure is in the range of about 8-85 MPa.

6. The method according to claim 1, wherein the entrapment solvent comprises an aerosol generating agent.

7. The method according to claim 6, wherein the entrapment solvent comprises a polyol.

8. The method according to claim 1, wherein the tobacco components include one or more of nicotine and tobacco aromas and flavors.

9. The method according to claim 1, wherein the entrapment solvent is provided in an upper portion of the vessel, above the tobacco in a lower portion, and the partition is selected from the group consisting of a bubble cap tray, a sieve plate, and a valve plate.

10. The method according to claim 1, wherein the entrapment solvent is provided in a lower portion of the vessel, below the tobacco in an upper portion, and the partition is selected from the group consisting of a sinter plate and a very fine mesh.

11. The method according to claim 1, wherein the method comprises an initial step of adding water to the tobacco.

12. The method of using the tobacco extract obtainable by the method according to claim 1, comprising generating an inhalable aerosol from the tobacco extract.

13. The method of using the tobacco extract according to claim 12, wherein the tobacco extract is used in a smoking article.

14. The method according to claim 11, wherein the amount of water added to the tobacco is from about 2% to 20% based on the dry weight of the tobacco.

15. The method according to claim 11, wherein the tobacco has a particle size range of from 355 μm to 3.5 mm.

16. The method according to claim 15, wherein the tobacco is ground Virginia tobacco leaf.

\* \* \* \* \*